United States Patent [19]

Dean et al.

[11] 4,190,071

[45] Feb. 26, 1980

[54] BACKFLOW PREVENTION DEVICES

[75] Inventors: Robert H. Dean, Evanston; Oliver Q. Dyer, Hoffman Estates, both of Ill.

[73] Assignee: International Telephone and Telegraph Corporation, New York, N.Y.

[21] Appl. No.: 832,785

[22] Filed: Sep. 12, 1977

[51] Int. Cl.² ............................................. F16K 31/12
[52] U.S. Cl. .................................... 137/115; 137/469; 137/494; 251/282; 251/357
[58] Field of Search .................. 137/115, 505.18, 469, 137/475, 476, 477, 478, 494; 251/61.3, 282, 357

[56] References Cited

U.S. PATENT DOCUMENTS

| 85,963 | 1/1869 | Richardson | 137/476 |
|---|---|---|---|
| 2,586,942 | 2/1952 | Grove | 137/115 |
| 2,869,569 | 1/1959 | Kimmell | 137/469 X |
| 2,880,750 | 4/1959 | Amison | 137/469 |
| 3,021,108 | 2/1962 | Noakes | 251/61.3 |
| 3,319,649 | 5/1967 | Cummins | 251/282 X |
| 3,330,297 | 7/1967 | Mowbray | 137/477 X |
| 3,448,763 | 6/1969 | Curtiss | 251/282 X |
| 3,905,689 | 9/1975 | Mylander | 251/357 X |

Primary Examiner—Harold W. Weakley
Attorney, Agent, or Firm—James B. Raden; Donald J. Lenkszus

[57] ABSTRACT

A backflow prevention device is disclosed which includes a pressure differential relief valve. The relief valve includes a lift chamber functioning to accelerate opening of the valve to assure that the valve fully opens once it has partially opened. The relief valve also includes construction features which allow control of the opening timing of the valve and which cause added closing force to be applied on the valve member to provide more positive closure thereof. Furthermore, a member is provided which substantially eliminates transfer of torque from a spring in the relief valve to a diaphragm therein and substantially eliminates angular cocking of the moveable valve assembly also in the relief valve.

16 Claims, 3 Drawing Figures

BACKFLOW PREVENTION DEVICES

BACKGROUND OF THE INVENTION

This invention relates to backflow prevention devices and, particularly, to improved pressure differential relief valves or dump valves for use in reduced pressure principle backflow preventers.

Reduced pressure principle backflow preventers are known for use on direct connections where back pressure or back siphonage could present a health hazard. Typically, these devices include serially interconnected first and second check valves with a gate valve at the inlet side of the first check valve and another gate valve at the outlet side of the second check valve. The devices also include a diaphragm operated pressure differential relief valve connected to a zone intermediate the outlet of the first check valve and the inlet of the second check valve. This relief valve operates on the basis of preselected pressure differential between the intermediate zone and the inlet side of the first check valve as sensed on the opposite sides of the diaphragm in the relief valve. If, for any reason, the pressure differential should drop below the preselected value (for example, because of a malfunction of either check valve during periods of back pressure or back siphonage), the relief valve opens to discharge any backflowing contaminants to atmosphere and to maintain the proper pressure differential thereby protecting the potable water supplies.

In the design and construction of these backflow prevention devices, it has been a continuing problem to provide products with operational characteristics which comply with increasingly stringent industry and governmental standards. For example, in order to comply with presently prevailing performance standards, the relief valve in a reduced pressure backflow preventer must open when differential pressure across the first check valve drops below 2.0 psi and must reclose when the differential pressure increases to 3.0. Optimally, the relief valve should operate with a flat characteristic curve between 2.0 and 3.0 psi differential at all hydrostatic pressures and, most preferably, the valve's differential characteristic operating curve will be sufficiently flat so that it will operate reliably between 2.25 psi and 2.75 psi at hydrostatic line pressures of from 30 to 175 psi. Additionally, the static pressure drop across the first check valve must be at least 3.0 psi greater than the pressure differential required to open the relief valve. Furthermore, the complete backflow prevention device must not restrict flow in a manner such that pressure drops are greater than about 14 psi at capacity flow, with less than 10 psi pressure drop occurring across the first check valve at capacity flow and, preferably, between 6 and 10 psi at flows from zero flow to capacity flow.

SUMMARY OF THE INVENTION

It is, therefore, an object of the present invention to provide backflow prevention devices which are able to meet all applicable industry and government standards and, additionally, capable of economically practical production with commercial tolerances on parts.

A further object is to provide backflow prevention devices wherein pressure drops across the cmplete device are less than about 14 psi and wherein the pressure drop across the first check valve, from zero flow to rated capacity flow of the device, is less than 10 psi and wherein the pressure drop at any flow rate from zero to capacity is in a range of 6 to 10 psi.

Another object is to provide new and improved differential pressure relief valves having operational characteristics such that the valve opens when differential pressure across the first check valve is below 2.0 psi and recloses at differential pressure of about 3.0 psi at all hydrostatic pressures.

A still further object is to provide differential pressure relief valves which close positively and quietly and remain closed with an operating differential pressure at least 3 psi less than that differential pressure produced across the first check valve.

DETAILED DESCRIPTION

Figure 1:
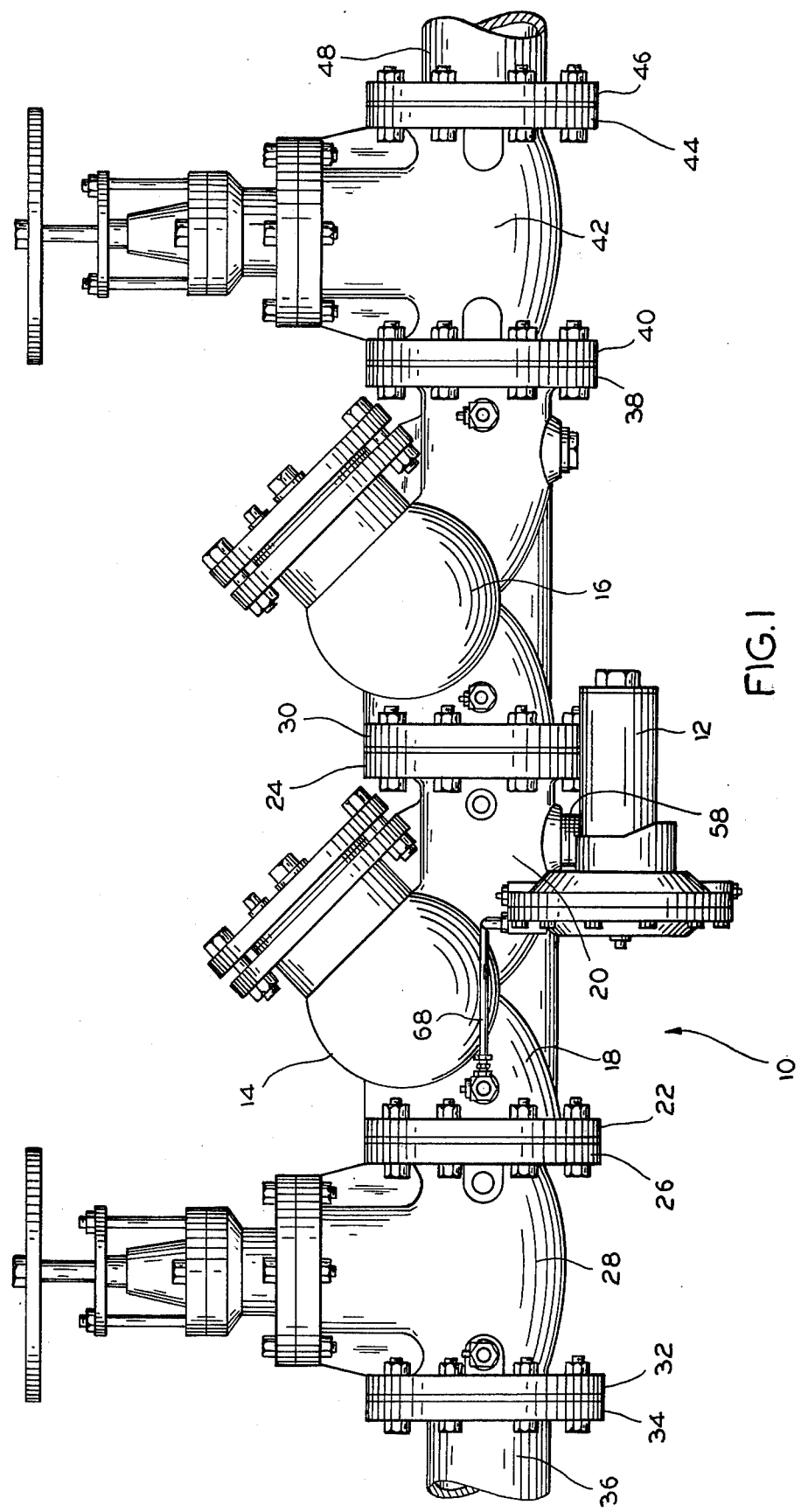
FIG. 1 is a side elevational view of the backflow preventer of the present invention installed in a piping system.

Referring first to FIG. 1, there is shown generally at 10 a backflow prevention assembly including a pressure differential relief valve 12 of the present invention which will be described in detail below. The assembly 10 also includes first and second check valves 14 and 16, respectively, which may be of any suitable construction such as standard spring loaded poppet type check valves, although these valves are preferably constructed in accordance with the check valve design disclosed in pending U.S. application Ser. No. 710,284.

As shown in FIG. 1, an inlet passageway 18 and an outlet passageway 20 are provided on the respective upstream and downstream ends of check valve 14. The ends of the valve 14 are provided with annular attachment flanges 22 and 24. Flange 22 is adapted for leak tight assembly to a similar flange 26 on adjacent upstream gate valve or shut-off valve 28. Flange 24 is adapted for leak tight assembly to a similar flange 30 of adjacent downstream check valve 16. Another annular attachment flange 32 is provided on the upstream end of gate valve 28 which is adapted for leak tight assembly to similar flange 34 on inlet pipe 36. A further annular attachment flange 38 on the downstream end of check valve 16 is adapted for leak tight assembly to annular attachment flange 40 provided on the upstream end of a second gate valve or shut-off valve 42. The gate valve 42 in turn has an annular attachment flange 44 at its downstream end which is adapted for leak tight assembly to a similar flange 46 on outlet pipe 48. The gate valves 28 and 42, the check valves 14 and 16 and the differential relief valve 12 communicatingly interconnected with passageways 18 and 20 of check valve 14 comprise the reduced pressure backflow preventer 10 of the present invention.

In normal operation with normal flow conditions, a fluid such as water enters through inlet pipe 36 and passes through gate valve or shut-off valve 28. Then, assuming that check valve 14 is open as a result of the valve poppet moving out of its closure position due to the fluid flow pressure, the fluid passes into check valve 14 through inlet passageway 18 and passes out of valve 14 through outlet passageway 20 into check valve 16. Check valve 16 is identical to check valve 14 in regard to its construction and its poppet type spring operations, except that check valve 14 is provided with a heavier spring so that check valve 14 will open at a higher pressure differential than valve 16. When the appropriate pressure builds up in passageway 20, valve 16 will open and allow passage of the fluid therethrough into gate valve 42 and thereafter into outlet pipe 48. Accordingly, under normal operating conditions, fluid entering through pipe 36 will pass through gate valve 28, check valves 14 and 16, and gate valve 42 and will exit from backflow device 10 through 48. Additionally, in normal operation, pressure differential relief valve 12 will remain closed allowing no fluid to be discharged or dumped to atmosphere.

The differential relief valve 12 operates on the basis of differential pressure sensed across check valve 14. Thus, when a condition arises wherein the pressure in passageway 20 approaches the pressure in passageway 18 as a result of a fluid backflow through a fouled or leaking check valve, the pressure differential relief valve 12 will operate to maintain the pressure differential above the minimum desired differential pressure across check valve 14 and any backflowing fluid will be discharged or dumped to atmosphere.

Figure 2:
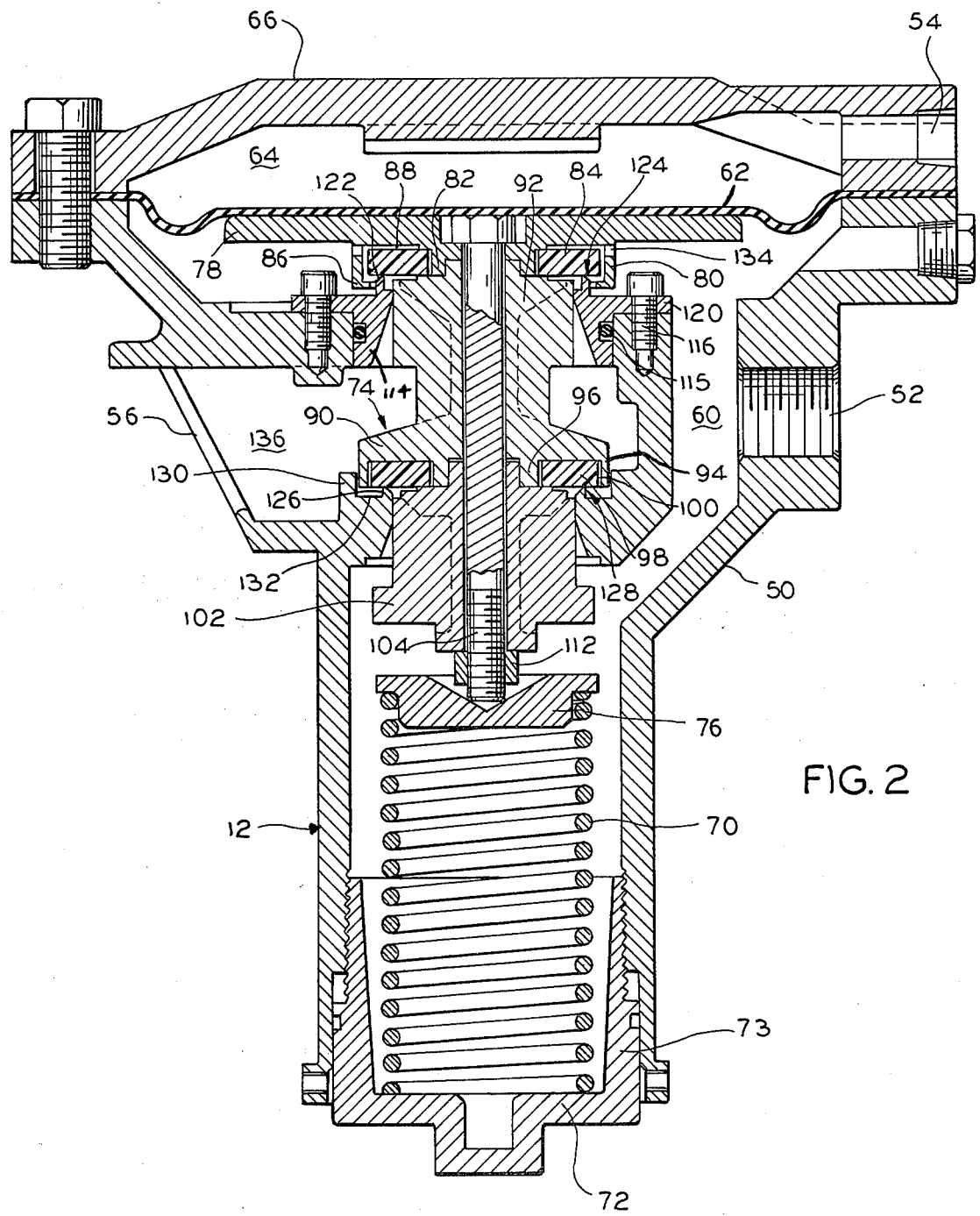
FIG. 2 is an enlarged sectional view taken longitudinally through the center of the pressure differential relief valve depicted in assembly in FIG. 1.

As seen in FIG. 2, relief valve 12 includes a valve body 50 having inlet ports 52 and 54 and a discharge port 56. The body 50 is affixed to the other elements of backflow device 10 by conduit 58 which interconnects port 52 with passage 20 as illustrated in FIG. 1 and provides a passage for fluid in passageway 20 to flow into channel 60 within valve body 50 and, also, allowing the fluid pressure in passageway 20 to be transmitted to the lower side of diaphragm 62 which is positioned in chamber 64 of body 50 and is fixed about its outer circumference between the body 50 and a bolt connected cover 66 which forms a portion of the body 50. Additionally, a tap connection 68 is provided between inlet passageway 18 and port 54 allowing the inlet pressure to be sensed on the upper side of diaphragm 62.

In addition to the fluid pressure from passageway 20 acting on the under side of diaphragm 62, there is a spring force exerted thereon by spring member 70. Spring 70 is seated on a ledge 72 in cap 73 of the body 50 at one end and operatively engages a moveable piston assembly 74 at its other extremity by means of a swivel plate 76 which is accommodated by the spring coils. The spring 70 with swivel plate 76 exerts a force on the moveable assembly 74 in a direction to open the valve with the swivel plate 76 acting to minimize torque from the spring being transferred to the diaphragm 62 and to minimize angular cocking of the moveable assembly 74.

Figure 3:
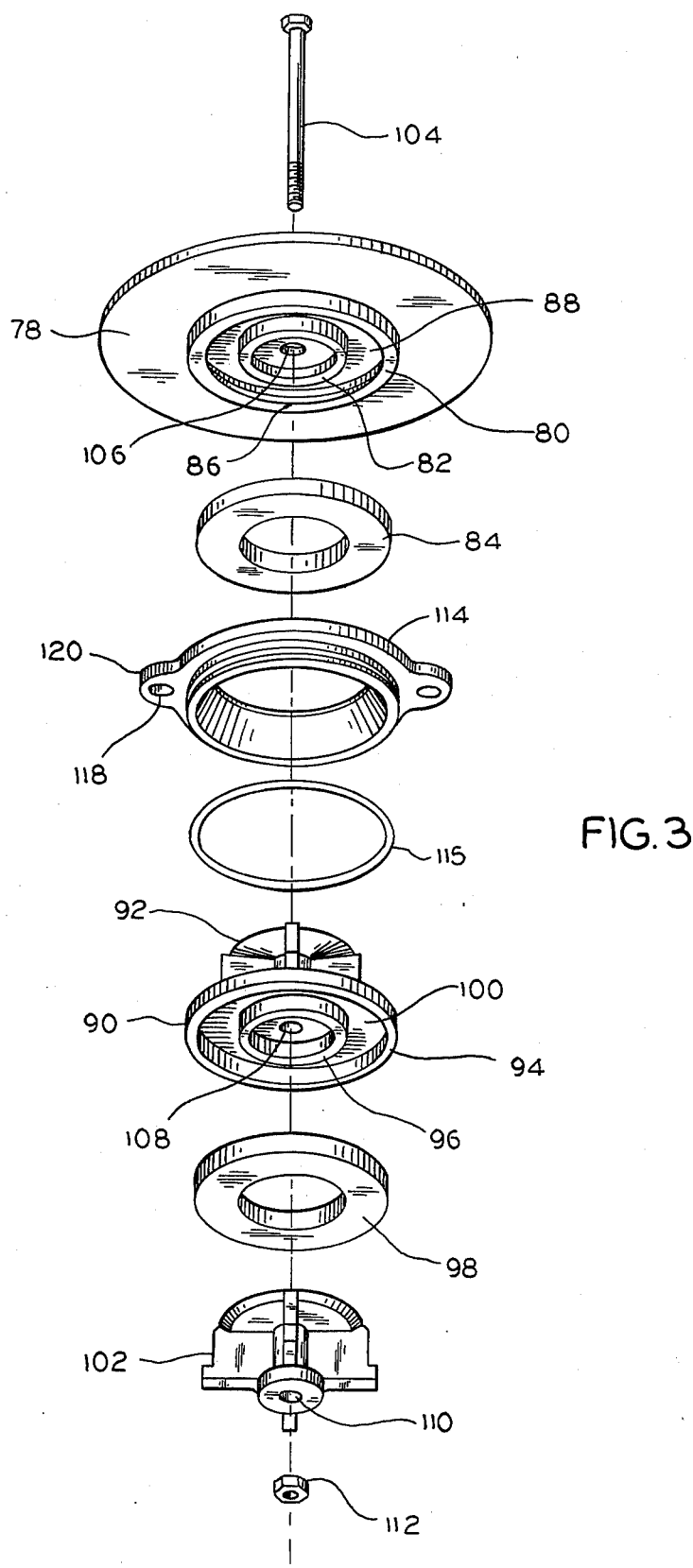
FIG. 3 is an exploded view of the moveable members of the relief valve depicted in FIG. 2.

The moveable assembly 74, as best illustrated in FIG. 3, includes a retaining disc 78 having a planar upper surface for operative engagement with diaphragm 62 and having annular collars 80 and 82 on its opposed surface for accommodating a relatively resilient sealing ring 84, annular collar 80 being contoured as its outer extremity to form a retaining lip 86 best seen in FIG. 2. This retaining lip 86 provides an engagement surface for sealing ring 84, which is only loosely fit into the annular channel 88 formed between collars 80 and 82, and allows positive lifting action of the ring 84 when the moveable assembly 74 is moved into a position wherein valve 12 is open. Furthermore, this lip 86 prevents vibration of the ring 84 under conditions of high pressure drop flows through valve 12 and, also, reliably holds the ring 84 in its correct position.

Additionally, moveable assembly 74 includes upper guide member 90 which provides a clamping or retention area 92 for ring 84 at its upper end and is provided with collars 94 and 96 on its bottom surface for accommodating another relatively resilient sealing ring 98 which fits loosely within the annular channel 100 formed between the collars 94 and 96. A lower guide member 102 is provided for clamping ring 98 in place. A bolt 104 acts as a central shaft for the assembly 74 and is engagingly fitted through central apertures 106, 108 and 110 formed in retaining disc 78, upper guide member 90, and lower guide member 102, respectively, and then a nut 112 is threaded onto the bolt 104 to fasten the assembly 74 together for cooperative piston motion.

The assembly 74 is positioned in a central opening in body 50 and is affixed thereto essentially in alignment with the center of swivel plate 76 and centrally of the diaphragm 62 by a continuous annulus 114, fitted with sealing O-ring 115, positioned in abutting relationship about the circumference of upper guide 90 and which is bolt connected to the body 50 by bolts 116 passing through bolt holes 118 in flange 120 of annulus 114. Annulus 114 also includes an annular valve seating flange 122 on the surface which abuts resilient sealing ring 84 to close valve seat area 124 when the valve 12 is closed. Another annular valve seating flange 126 is provided on body 50 to close valve seat area 128 by abutting resilient sealing ring 98 when valve 12 is closed.

As one example of an improvement in the construction of the relief valve 12, it should be noted that projecting annulus 130 of valve body 50 which circumferentially surrounds the outer periphery of a portion of annular collar 94 of upper guide member 90 is positioned so as to provide a lift chamber 132. This chamber 132 which is formed by the closely fitting concentric cylindrical shapes of annulus 130 and collar 94 in conjunction with valve seat area 128 performs an important function in causing an accelerated opening of the valve assuring that the valve fully opens once it has partially opened. Specifically, the relief valve 12 of the present invention is constructed so that valve seat 128 opens before valve seat 124 and flow through valve seat area 128 is restricted as a result of the close fitting concentric positioning of annulus 130 and collar 94. Thus, as the seat 128 opens, fluid flows across the seat in an essentially radially outward direction into the lift chamber 132 and the effect of the fluid entering and being restricted in chamber 132 is to effectively increase the piston area of the lower valve seat 128 and in turn forcing the moveable assembly 74 to open the upper valve seat 124 a positive and predetermined amount. The predetermined amount is directly proportional to the axial engagement length of the concentric cylindrical annulus 130 and collar 94. It is this forced movement which assures full valve opening at any fluid pressure. However, it has been found that without the lift chamber to promote the positive and predetermined movement, the combined velocities of fluid flow across valve seats 128 and 124 reduce the static pressure under the moveable assembly 74 and thereby prevent the valve from fully opening, particularly at pressures above 70 psi.

As a further example of an improvement in the construction of the relief valve 12, vent holes 134 of preselected sizes and numbers are provided in annular collar 80 in order to control the opening timing of the valve. Specifically, line pressure fluctuations, rapid decreases in flow and/or backflow can cause valves of the type described in this invention to open too suddenly or too slowly. Sudden opening can cause unnecessary wear or damage to the valve elements while slow opening may allow contaminated fluid to backflow into the supply line. In the present relief valve construction, sealing ring 84 and the annular channel 88 around this ring form a dash pot. By adding vent holes 134 to this dash pot, it has been found that the opening timing of the valve can be advantageously controlled. It has been further found that two vent holes spaced approximately 180° apart and having a 0.093 inch diameter are particularly preferred and providing valve opening timing of one to five seconds. However, other vent hole sizes, numbers and spacings may be employed depending on the specific opening timing characteristics desired.

A further construction improvement in the present relief valve 12 is the provision of valve seat areas 124 and 128 having different effective areas. As a result of this construction feature wherein valve seat area 128 has a slightly smaller cross-sectional area than valve seat 124, an added closing force is provided in the valve 12 and this causes valve seat 128 to more positively engage sealing ring 98 as static pressure increases thereby providing a more positive closure of the valve.

The operation of relief valve 12 follows a sequence such that under no flow conditions through the backflow preventer 10 so that there is no pressure built up in inlet passageway 18, the relief valve 12 which is biased to a normally open position is opened by means of spring 70 acting on assembly 74. Then, as fluid flow is initiated into the device 10 through gate valve 28 into inlet passageway 18, pressure begins to increase until the pressure in passageway 18 rises to a preselected threshold level between 2.0 and 3.0 psi above atmospheric pressure, at this pressure level the biasing force of spring 70 holding the relief valve 12 open is overcome by the pressure on the diaphragm 62 in relief valve 12 which is communicated thereto through tap connection 68 from inlet passageway 18. Accordingly, at a preselected pressure level of between 2.0 and 3.0 psi, the moveable assembly 74 of relief valve 12, is moved into the closed position as illustrated in FIG. 2 whereby access to the discharge port 56 is positively shut off allowing no discharge to atmosphere.

Thereafter, as fluid flow continues, the pressure build up in passageway 18 until a pressure of 3.0 psi or higher above the maximum threshhold pressure for closing the relief valve is reached, at which point check valve 14 opens admitting fluid into passageway 20 through check valve 14. As pressure continues to build up in passageways 18 and 20, a nominal 6 psi pressure differential is maintained between the pressure in inlet passageway 18 and the lower pressure outlet passageway 20. This pressure differential, sensed on the diaphragm 62 in relief valve 12, from inlet passageway 18 is a nominal 6 psi greater pressure than the pressure sensed on the other side of the diaphragm 62 from outlet passageway 20 and the relief valve continues to remain in a closed position. Capacity flow through the backflow preventer is then obtained as the pressure caused by continued fluid flow rises, although the pressure differential between inlet passageway 18 and outlet passageway 20 is maintained in the range of 6 to 10 psi, and check valve 16 opens to allow fluid to flow through check valve 16 and gate valve 42 into pipe 48.

In the event of a backflow condition from pipe 48 through a fouled or leaking check valve 16 into passageway 20, the pressure in passageway 20 will rise approaching the pressure in inlet passageway 18. Howevever, when the pressure in passageway 20 reaches a level within between 2 and 3 psi less than the inlet pressure in passageway 18, the relief valve 12 will open as a result of spring 70 forcing moveable assembly 74 into an open position whereby fluid exits from passageway 20 through conduit 58 into channel 60 in relief valve 12, then through valve seat areas 124 and 128 into discharge 136 and through port 56 to atmosphere. Additionally, should a backflow condition arise, as a result of the fouling of check valve 14 so that the pressure differential across valve 14 reduced to a level of less than 2 psi, then the biasing force of spring 70 in relief valve 12 will cause the moveable assembly 74 to open and drainage of fluid will occur in the same manner as detailed above in regard to the fouling or leaking of check valve 16 and serves as a warning that check valve 14 is fouled.

What has been taught, then, is a backflow prevention device utilizing a new and improved pressure differential relief valve having operationally characteristics such that the valve opens when differential pressure across the upstream check valve is below 2.0 psi and remains closed at differential pressure above 3.0 psi at all hydrostatic pressures and the relief valve closes positively and quietly and remains closed with the operating differential pressure 3 psi less than that produced across the upstream check valve.

The form of the invention illustrated and described herein is but a preferred embodiment of these teachings. It is shown as an illustration of the inventive concept, however, rather than by way of limitation, and it is pointed out that various modifications and alterations may be indulged in within the scope of the appended claims.

What is claimed is:

1. A backflow prevention device comprising first and second shut-off valves, first and second spring operated check valves and a differential pressure relief valve, said first shut-off valve being connected on its upstream end to an inlet pipe and on its downstream end to said first check valve, said first check valve being connected on its downstream end to said second check valve, said second check valve being connected on its downstream end to said second shut-off valve and said second shut-off valve being connected on its downstream end to an outlet pipe, said relief valve being communicatingly interconnected between the upstream end of said first check valve and said downstream end of said first check valve to provide pressure relief on the downstream end of said first check valve when a backflow condition occurs in said device, said differential pressure relief valve comprising a valve body having an inlet communicatingly connected to said downstream end of said first check valve, an outlet port and first and second valve seat areas, a diaphragm mounted in said body and a moveable valve assembly also mounted internally of said body for movement in an axial direction thereof and in position to be operatively engaged by said diaphragm, said moveable valve assembly including:

(a) a retaining member having one surface operatively engageable with said diaphragm and having concentric first radially inner and first radially outer annular collars on its opposed surface with a first annular channel being formed between said first and second collars;

(b) a first sealing ring positioned in said first channel, said first sealing ring having a first portion and a movable portion;

(c) a first guide member having one surface abutting said first portion of said first sealing ring for retaining said ring in said first channel and having concentric second radially inner and second radially outer annular collars on its opposed surface with a second annular channel being formed between said inner and outer collars;

(d) a second sealing ring positioned in said second channel;

(e) a second guide member having a surface abutting said second sealing ring for retaining said ring in said second channel; and (f) means for fastening the assembly together for cooperative piston motion including a central shaft engagingly fitted through central apertures in said retaining member and said first and second guide member;

said valve body further including first and second annular seat flanges positioned in said first and second valve seat areas, respectively, for engagement with and disengagement from said first and second sealing rings to control fluid flow from said inlet port to said outlet port through said first and second valve seat areas, said moveable assembly being biased by a spring in said valve body to a normally open position wherein said first sealing ring is axially spaced from said first valve seat flange and said second sealing ring is axially spaced from said second valve seat flange, means for introducing differential pressure from said upstream and downstream ends of said first check valve into said valve body on opposing sides of said diaphragm whereby said diaphragm causes said moveable assembly to move into a closed position when said differential pressure is above a first predetermined level wherein said first valve seat flange sealingly abuts said first sealing ring and said second valve seat flange sealingly abuts said second sealing ring, and whereby said diaphragm causes said movable assembly to move into an opened position when said pressure differential is below a second predetermined level, said second valve seat area opening prior to said first valve seat area opening under certain pressure conditions, a projecting annulus included in said valve body, said projecting annulus circumferentially surrounding the outer periphery of said second radially outer collar of said first guide member in close concentric proximity thereto whereby a lift chamber is formed in the second valve seat area which provides an added force on the moveable assembly to cause accelerated opening of the valve to its fully open condition once it has partially opened.

2. The backflow prevention device of claim 1 wherein said movable portion is subjected to positive lifting action under said certain pressure conditions such that said movable portion maintains contact with said first annular valve seat flange when said second valve seat is partially opened, and wherein said first radially outer annular collar of said relief valve includes a retaining lip at its extremity for engagement with said movable portion of said first sealing ring to limit the positive lifting action of said ring when said moveable assembly is being moved into a position wherein said valve is open and to prevent vibration of said ring when said fluid flows through said valve.

3. The backflow prevention device of claim 1 wherein said first radially outer annular collar of said relief valve includes a plurality of radially extending vent holes providing fluid communication to the side of said movable portion adjacent said first channel to control the opening timing of said valve.

4. The backflow prevention device of claim 1 wherein said relief valve includes means accommodated by said spring for substantially eliminating transfer of torque from said spring to said diaphragm and for substantially eliminating angular cocking of said moveable assembly.

5. The backflow prevention device of claim 1 wherein the effective area of said first valve seat area in said relief valve is slightly greater than the effective area of said second valve seat area whereby an additional closing force is provided in said valve.

6. A backflow prevention device comprising first and second shut-off valves, first and second spring operated check valves and a differential pressure relief valve, said first shut-off valve being connected on its upstream end to an inlet pipe and on its downstream end to said first check valve, said first check valve being connected on its downstream end to said second check valve, said second check valve being connected on its downstream end to said second shut-off valve and said second shut-off valve being connected on its downstream end to an outlet pipe, said relief valve having a fluid inlet communicatingly interconnected to said downstream side of said first check valve a fluid outlet; first and second valve seat areas, a diaphragm and means for cooperatively opening and closing said valve seat areas in response to the action of said diaphragm to control fluid flow from said inlet to said outlet, the effective area of said first valve seat is slightly greater than the effective area of said second valve seat area whereby an additional closing force is provided on said opening and closing means in response to said fluid flow, a lift chamber in said second valve seat which provides an added opening force on said opening and closing means in response to said fluid flow through said second valve seat, and means responsive to fluid pressure such that said first and second valve seat areas open sequentially.

7. The backflow prevention device of claim 6 wherein said opening and closing means in said relief valve comprises a moveable valve assembly mounted in said valve for movement in an axial direction thereof, said moveably assembly including means for controlling the opening timing of said valve responsive to fluid flow through said second valve seat.

8. The backflow prevention device of claim 7 wherein said relief valve includes a spring normally biasing said moveable valve assembly to an open position and means accommodated by said spring for substantially eliminating transfer of torque from said spring to said diaphragm and for substantially eliminating angular cocking of said moveable valve assembly.

9. A differential pressure relief valve for a backflow prevention device comprising a valve body having inlet and outlet ports and first and second valve seat areas, a diaphragm mounted in said body and a moveable valve assembly also mounted internally of said body for movement in an axial direction thereof and in position to be operatively engaged by said diaphragm, said moveable valve assembly including:

(a) a retaining member having one surface operatively engageable with said diaphragm and having concentric first radially inner and first radially outer annular collars on its opposed surface with a first annular channel being formed between said first and second collars;

(b) a first sealing ring positioned in said first channel, said first sealing ring having a first portion and a movable portion;

(c) a first guide member having one surface abutting said first portion of said first sealing ring for retaining said ring in said first channel and having concentric second radially inner and second radially annular collars on its opposed surface with a second annular channel being formed between said inner and outer collars;

(d) a second sealing ring positioned in said second channel;

(e) a second guide member having a surface abutting said second sealing ring for retaining said ring in said second channel; and (f) means for fastening the assembly together for cooperative piston motion including a central shaft engagingly fitted through central apertures in said retaining member and said first and second guide members;

said valve body further including first and second annular valve seat flanges positioned in said first and second valve seat areas, respectively, for engagement with and disengagement from said first and second sealing rings to control fluid flow from said inlet port to said outlet port through said first and second valve seat areas, said moveable assembly being biased by a spring in said valve body to a normally open position wherein said first sealing ring is axially spaced from said first valve seat flange and said second sealing ring is axially spaced from said second valve seat flange, means for introducing differential pressure into said valve body on opposing sides of said diaphragm whereby said diaphragm causes said moveable assembly to move into a closed position when said differential pressure is above a first predetermined level wherein said first valve seat flange sealingly abuts said first sealing ring and said second valve seat flange sealingly abuts said second sealing ring, and whereby said diaphragm causes said movable assembly to move into an opened position when said pressure differential is below a second predetermined level, said second valve seat area opening prior to said first valve seat under certain pressure conditions, a projecting annulus included in said valve body, said projecting annulus circumferentially surrounding the outer periphery of said second radially outer collar of said first guide member in close concentric proximity thereto whereby a lift chamber is formed in the second valve seat area which provides an added force on the moveable assembly to cause accelerated opening of the valve to its fully open condition once it has partially opened.

10. The relief valve of claim 9 wherein said movable portion is subjected to positive lifting action under certain pressure conditions such that said movable portion maintains contact with said first annular valve seat flange when said second valve seat area is partially opened, and wherein said first radially outer annular collar includes a retaining lip as its extremity for engagement with said movable portion of said first sealing ring to limit the positive lifting action of said ring when said moveable assembly is being moved into a position wherein said valve is open and to prevent vibration of said ring when said fluid flows through said valve.

11. The relief valve of claim 9 wherein said first radially outer annular collar includes a plurality of radially extending vent holes providing fluid communication to the side of said movable portion adjacent said first channel to control the opening timing of said valve.

12. The relief valve of claim 9 including means accommodated by said spring for substantially eliminating transfer of torque from said spring to said diaphragm and for substantially eliminating angular cocking of said moveable assembly.

13. The relief valve of claim 9 wherein the effective area of said first valve seat area is slightly greater than the effective area of said second valve seat area whereby an additional closing force is provided in said valve.

14. A differential pressure relief valve having a fluid inlet, a fluid outlet, first and second valve seat areas, a diaphragm and means for cooperatively opening and closing said valve seat areas in response to the action of said diaphragm to control fluid flow from said inlet to said outlet, the effective area of said first valve seat is slightly greater than the effective area of said second valve seat area whereby an additional closing force is provided on said opening and closing means in response to said fluid flow through said second valve seat area, a lift chamber in said second valve seat which provides an added opening force on said opening and closing means in response to said fluid flow through said second valve seat, and means responsive to fluid pressure such that said first and second valve seat areas open sequentially.

15. The relief valve of claim 14 wherein said opening and closing means comprises a moveable valve assembly mounted in said valve for movement in an axial direction thereof, said moveable assembly including means for controlling the opening timing of said valve responsive to fluid flow through said second valve seat.

16. The relief valve of claim 15 including a spring normally biasing said moveable valve assembly to an open position and means accommodated by said spring for substantially eliminating transfer of torque from said spring to said diaphragm and for substantially eliminating angular cocking of said moveable valve assembly.

* * * * *